(12) United States Patent
Nies (10) Patent No.: US 9,470,208 B2
(45) Date of Patent: Oct. 18, 2016

(54) WIND TURBINE AND LOCKING METHOD

(75) Inventor: Jacob Johannes Nies, Zwolle (NL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1055 days.

(21) Appl. No.: 13/541,881

(22) Filed: Jul. 5, 2012

(65) Prior Publication Data

US 2014/0010651 A1    Jan. 9, 2014

(51) Int. Cl.
*F03D 7/02* (2006.01)

(52) U.S. Cl.
CPC ........... *F03D 7/0248* (2013.01); *F03D 7/0268* (2013.01); *F03D 80/00* (2016.05); *F16C 2360/31* (2013.01); *Y02E 10/721* (2013.01); *Y02E 10/722* (2013.01); *Y02E 10/723* (2013.01); *Y02E 10/726* (2013.01)

(58) Field of Classification Search
CPC .. F03D 7/0248; F03D 7/0268; F03D 11/005; F03D 11/0075
USPC ............................................... 416/1, 46, 153
See application file for complete search history.

(56) References Cited

U.S. PATENT DOCUMENTS

| | | | | |
|---|---|---|---|---|
| 5,035,575 | A * | 7/1991 | Nielsen et al. | 416/9 |
| 7,351,033 | B2 * | 4/2008 | McNerney | 416/1 |
| 7,355,294 | B2 * | 4/2008 | Teichmann | 290/44 |
| 7,397,145 | B2 * | 7/2008 | Struve et al. | 290/55 |
| 7,948,100 | B2 * | 5/2011 | Nies et al. | 290/44 |
| 2008/0181761 | A1 * | 7/2008 | Moore et al. | 415/1 |
| 2008/0240922 | A1 * | 10/2008 | Eusterbarkey | 416/204 R |
| 2010/0194114 | A1 * | 8/2010 | Pechlivanoglou et al. | 290/55 |
| 2010/0202884 | A1 * | 8/2010 | Wedekind et al. | 416/153 |
| 2010/0232978 | A1 * | 9/2010 | Nielsen et al. | 416/248 |
| 2011/0123339 | A1 * | 5/2011 | Eriksen et al. | 416/169 R |
| 2011/0133476 | A1 * | 6/2011 | Nies | 290/55 |
| 2011/0135481 | A1 * | 6/2011 | Koronkiewicz | 416/220 R |
| 2011/0138626 | A1 * | 6/2011 | Tirumalai et al. | 29/889.7 |
| 2011/0280725 | A1 * | 11/2011 | Taylor et al. | 416/1 |
| 2011/0316278 | A1 * | 12/2011 | Siegfriedsen | 290/44 |
| 2012/0045340 | A1 * | 2/2012 | Holling et al. | 416/220 R |
| 2012/0073117 | A1 * | 3/2012 | Benedict | 29/596 |
| 2012/0091724 | A1 * | 4/2012 | Bodenstein et al. | 290/55 |
| 2012/0131786 | A1 * | 5/2012 | Neumann | 29/464 |
| 2012/0133147 | A1 * | 5/2012 | Numajiri | 290/55 |

* cited by examiner

*Primary Examiner* — Sean J Younger
(74) *Attorney, Agent, or Firm* — Douglas D. Zhang; Global Patent Operation (57) ABSTRACT

A method of locking a rotor of a wind turbine, the method including positioning of the rotor in a locking position; applying a rotor lock; forcing the rotor to turn in a first direction; and, applying a rotor brake.

20 Claims, 5 Drawing Sheets

FIG. 1

(PRIOR ART)

WIND TURBINE AND LOCKING METHOD

BACKGROUND OF THE INVENTION

The subject matter described herein relates generally to methods and systems for wind turbines, and more particularly, to methods and systems for braking or locking of wind turbines.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

Some known wind turbines include a rotor-brake and a rotor-lock. The rotor-lock typically provides a higher load limit, especially when the brake is applied at the low-speed shaft of the turbine. The load limit of the rotor-lock is designed for a maximum expected load, e.g. during a storm. The rotor-lock may only be applied when the rotor shaft of the wind turbine stands still. The rotor-brake typically provides a lower load limit, wherein higher loads do not lead to a damage of the rotor-brake. The rotor-brake provides slip if the load gets higher than the load limit of the rotor-brake. Rotor-brakes may sometimes also be used when the rotor shaft is rotating slowly to stop the rotor shaft completely. Technical background to rotor-brakes and rotor-locks, or other methods for applying a braking force to a rotor shaft of a wind turbine, may be found in U.S. Pat. No. 7,948,100.

The costs for the rotor-brake and the rotor-lock of a wind turbine contribute to the total costs of the wind turbine with several percent. There is therefore a need for a method and a wind turbine using the rotor-brake and the rotor-lock more efficient to maybe reduce the size and costs of the rotor-brake or the rotor-lock.

BRIEF DESCRIPTION OF THE INVENTION

In one aspect, a method of locking a rotor of a wind turbine is provided. The method includes positioning of the rotor in a locking position, applying a rotor lock, forcing the rotor to turn in a first direction, and applying a rotor brake.

In another aspect, a wind turbine is provided. The wind turbine includes a rotor for transmitting torque from rotor blades to a rotor shaft a rotor lock engageable with the rotor shaft, and, a rotor brake engageable with the rotor shaft, wherein the sum of a brake clearance of the rotor brake and a brake deflection at maximum brake load is smaller than the sum of a lock clearance and a lock deflection at maximum lock load of the rotor lock.

In yet another aspect, a wind turbine is provided. The wind turbine includes a rotor for transmitting torque from rotor blades to a rotor shaft; a rotor lock engageable with the rotor shaft; a rotor brake engageable with the rotor shaft; and, a control unit adapted for positioning of the rotor in a locking position, applying the rotor lock, forcing the rotor to turn in a first direction, and, applying the rotor brake.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying FIGS. wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine, having a rotor shaft using a rotor-brake and a rotor-lock, which is capable of withstanding high loads. For example, during a storm the rotor brake and the rotor lock may be used simultaneously. More specifically, the rotor-brake and the rotor-lock are used in parallel to yield a higher load limit. Thereby, costs of the wind turbine may be reduced. Typical embodiments include a method of locking a rotor of a wind turbine, wherein the method allows for using the rotor-brake and the rotor-lock in parallel. With wind turbines and methods of typical embodiments the capability of the wind turbine to withstand storms may be enhanced. Alternatively or in addition, the weight of the wind turbine, especially of the nacelle may be reduced due to the usage of smaller rotor-brakes or smaller rotor-locks.

As used herein, the term rotor-brake is intended to be representative of any brake capable of decelerating or fixing the rotor shaft, wherein a brake provides slip incase the torque of the rotor shaft is higher than a typical slip limit. One example for a rotor-brake is a disk brake using one or more disks. Typical rotor-brakes include an electro-hydraulic actuator or a spring-operated caliper. Other brakes providing slip are drum brakes, which may be used for typical embodiments. The rotor-brake may be arranged at a low-speed shaft or at a high-speed shaft in case a gearbox is incorporated in the wind turbine drive-train of typical wind turbines described herein. As used herein, the term rotor-lock is intended to be representative of locking mechanisms capable of locking the rotor shaft. Such locking mechanisms may include a hydraulically movable bolt or a spring-actuated bolt attached to a solid part of the wind turbine nacelle. Other locking mechanisms include pins or plates. Disks with holes may be used for an interaction with the bolt or the pin. Typical embodiments include a nut or a hole in the rotor hub for an engagement with a second locking part like a bolt, a pin or a plate. Typically, the rotor-lock may be applied at the low-speed shaft or at the high-speed shaft in case of a wind turbine providing a gearbox in the drive-train. Further typical wind turbines include a direct drive, wherein the rotor is coupled directly to the generator without a gearbox in the drive train between the rotor and the generator.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
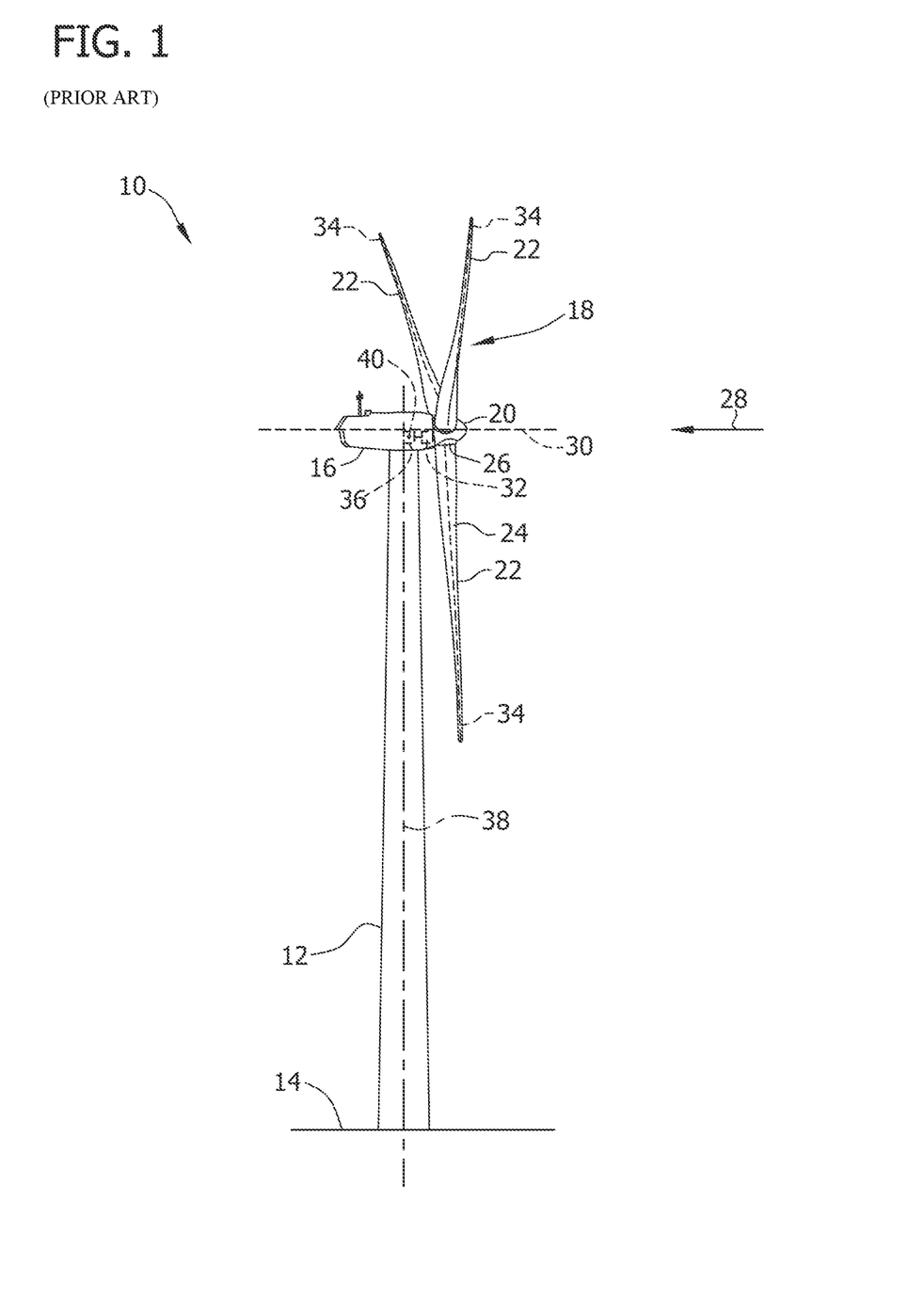
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
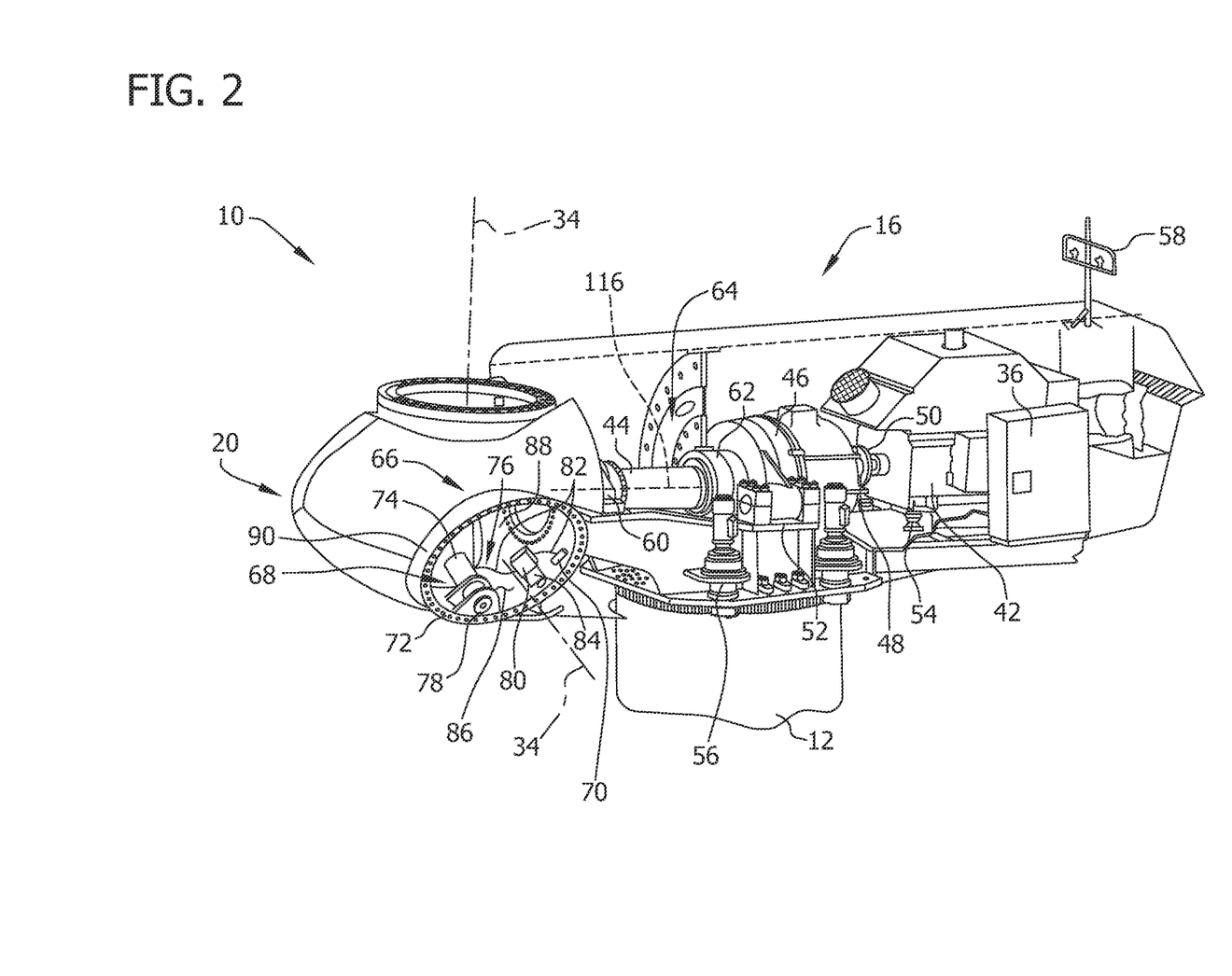
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates the production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
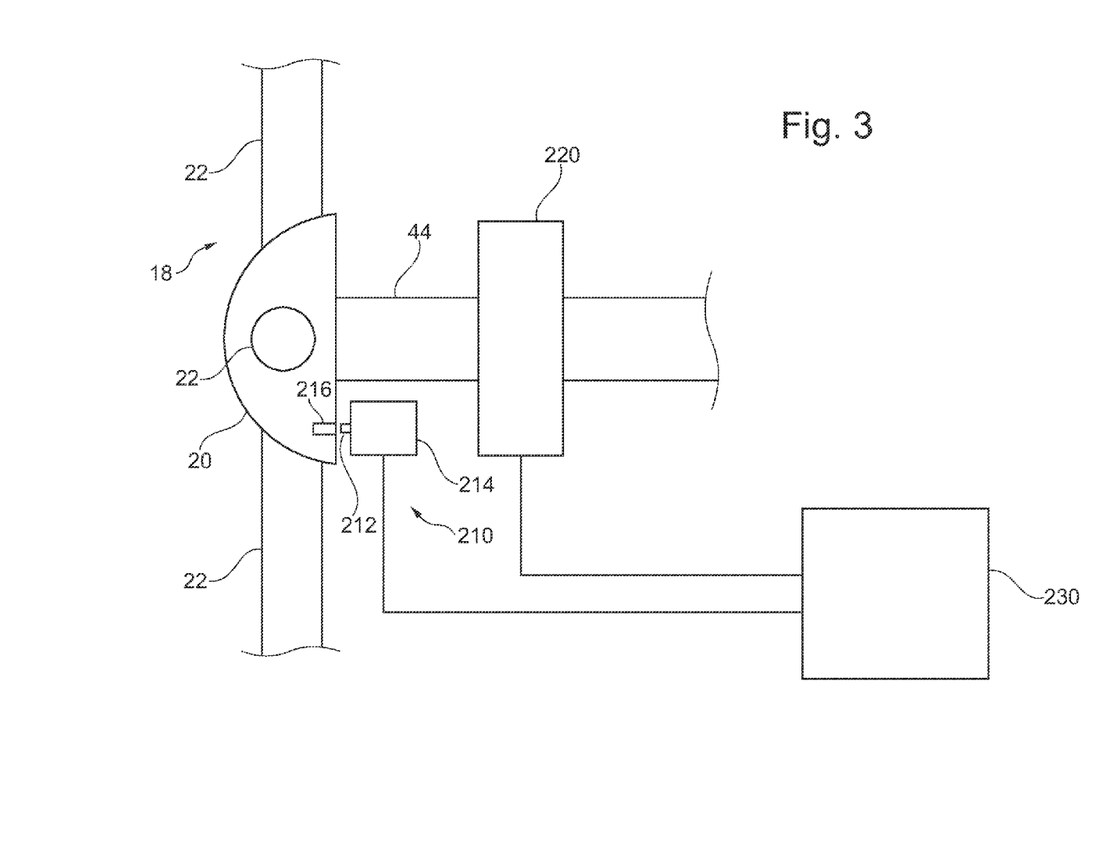
FIG. 3 is a block diagram of an exemplary embodiment of a wind turbine.

FIG. 3 is a block diagram of an exemplary embodiment of a wind turbine. FIG. 3 will be explained with reference to FIGS. 1 and 2 showing several similar parts as shown in FIG. 3. The embodiment of FIG. 3 comprises a rotor 18 with a rotor hub 20 to which rotor blades 22 are attached. The rotor hub 20 is mounted to a rotor shaft 44 for transmitting torque of the rotor to a generator.

Typical embodiments include a rotatable hub with at least one rotor blade coupled to and extending outward from the hub. Some embodiments of wind turbines comprise three rotor blades. Other exemplary embodiments comprise two or four rotor blades or another number of rotor blades. Typical embodiments comprise a rotor shaft coupled to a gearbox, the gearbox connecting the rotor shaft with a generator. Further exemplary embodiments comprise a rotor shaft coupling the rotor hub directly to the generator, wherein the gearbox may be omitted.

The exemplary embodiment of a wind turbine, parts of which are shown in FIG. 3 includes a rotor-lock 210. The rotor-lock 210 shown in FIG. 3 includes a locking bolt 212. The locking bolt 212 is movable by a locking actuator 214. Incase the locking bolt 212 is actuated by the locking actuator 214, the locking bolt 212 is forced into a locking recess 216 of the rotor hub 20. By doing so, the rotational position of the rotor hub 20 is locked relative to the nacelle. The locking recess 216 has a diameter slightly higher than the outer diameter of the locking bolt 212. With this arrangement the locking bolt 212 can easily be urged into the locking recess 216 in case the rotor hub 20 is in the correct position for locking.

Typical embodiments include a rotor-lock with a locking mechanism including a locking bolt and a locking recess. Further embodiments include a rotor-lock with a locking plate which may be urged into a locking nut. Exemplary embodiments include one rotor-lock; other exemplary embodiments include two or more rotor-locks to enhance the load limit of the lock. Different types of rotor-locks are combined in exemplary embodiments.

The embodiment shown in FIG. 3 includes a rotor-brake 220. The rotor-brake 220 of the exemplary embodiment shown in FIG. 3 is a disk brake allowing a considerable amount of slip in case a load limit for slipping is reached. Both the rotor-lock 210 and the rotor-brake 220 are fixed to a nacelle of the wind turbine. In embodiments, the rotor brake and the rotor lock are arranged at the low-speed shaft of the gearbox or between the rotor and the gearbox of the wind turbine. In embodiments, the rotor-brake, the rotor lock or both may be at the high-speed shaft of a gearbox or between the gearbox and the generator of the wind turbine.

The sum of a brake clearance of the rotor-brake 220 and a brake deflection at maximum brake load of the rotor-brake 220 is smaller than the sum of a lock clearance and a lock deflection at maximum lock load of the rotor-lock 210. In the exemplary embodiment shown in FIG. 3 the sum of the lock clearance and the lock deflection at maximum lock load is 1.2 of the sum of the brake clearance of the rotor-brake 220 and the brake deflection at maximum brake-load.

With the sum of a brake clearance of the rotor-brake and a brake deflection at maximum brake load being smaller than the sum of a lock clearance and a lock deflection at maximum lock load of the rotor-lock, it is possible to use the rotor-lock and the rotor-brake in parallel for a maximum load. Such maximum load cases may be a extreme event load. Such an extreme event load may by way of example include wind conditions, grid failures, turbine malfunctioning and maintenance conditions. Typically, load cases are defined per regulations. As an example, the IEC 61400 guideline may be named. It shows several Design Load Cases (DLCs), wherein also extreme wind conditions including storms, gusts and wind direction changes, also in combination with the parked position, are named. With clearance combinations of typical embodiments, the rotor-lock, the rotor-brake or both may be smaller compared to other wind turbines. The brake clearance of the rotor-brake refers to the amount of rotation which is necessary before the rotor-brake has an effect. The brake deflection at maximum brake load depends on the stiffness of the rotor-brake and the stiffness of the mounting of the rotor-brake in the nacelle. The lock clearance depends mainly on the type of the rotor-lock. Exemplary embodiments having a rotor-lock with a locking bolt have a lock clearance depending on the difference of the diameters of the locking recess and the locking bolt. Again, the lock deflection at maximum lock load depends on the rotor-lock and the mounting of the rotor-lock in the nacelle. One possibility used in embodiments to manipulate the sum of the lock clearance and the lock deflection is to vary the lock clearance. This can be done by reducing the diameter of the locking bolt. Another possibility is to enlarge the diameter of the lock recess. Furthermore, the mounting of the rotor-brake can be made very stiff to reduce the brake deflection at maximum brake load. Typically, the maximum brake load refers to the load at which slipping occurs. This load can also be referred to as the slip load of the rotor-brake.

The rotor-brake 220 and the rotor-lock 210 are controlled by control unit 230. Typical embodiments comprise a control unit 230 arranged in a housing of a control system of the wind turbine. The control system is used for controlling at least a part of the main functions of the wind turbine. The control unit 230 as a part of the control system coordinates the actions of the rotor-lock 210 and the rotor-brake 220.

Typical embodiments include a control unit for positioning of the rotor in a locking position, inserting the rotor lock, forcing the rotor to turn in a first direction and applying the rotor-brake. By doing so, one can drive clearances in the system out in the first direction. This has the effect that the slip load limit or the load limit of the rotor-brake is reached in the second, opposite direction before the rotor-lock acts. The reason is that the lock clearance is driven out in the first direction such that in the second direction the complete lock clearance may be used.

Figure 4:
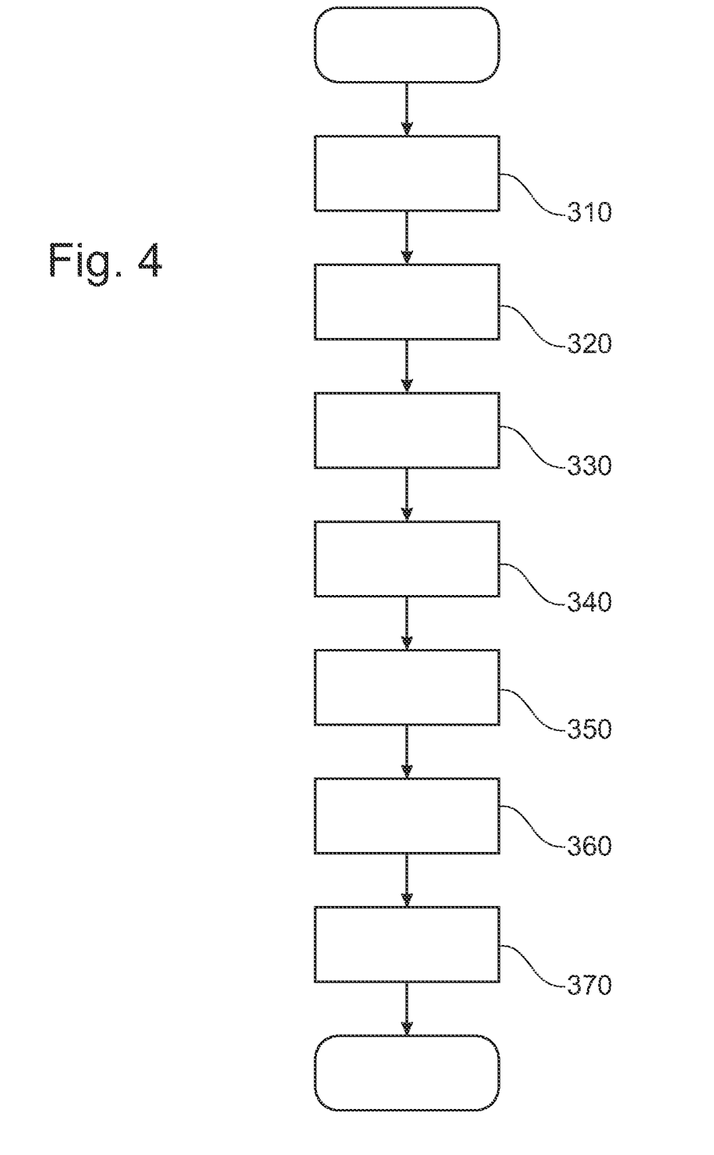
FIG. 4 is a block diagram of a method according to a typical embodiment.

FIG. 4 is a block diagram of a method according to a typical embodiment. The method of the typical embodiment may be used in combination with the exemplary embodiments of wind turbines illustrated in FIG. 1, 2 or 3. Reference is made to the descriptions of FIGS. 1, 2 and 3 for the description of FIG. 4.

Methods of typical embodiments may be used in connection with preparing exemplary wind turbines for a storm event. Typically, the pitch angle of the blades is adjusted using the pitch system to minimize the torque acting on the rotor shaft during storms. The methods according to typical embodiments may also be used whenever the wind turbine is brought to a stand still position, in case of a technical failure of other components of the wind turbine or in case of a removal from service due to other reasons. After stopping the rotor of the wind turbine, the rotor is brought into a locking position 310. This may be done by turning the rotor using the generator as an electrical machine or by positioning of the rotor blades in an adequate manner. Reference is made to the application U.S. Pat. No. 7,948,100 for positioning the rotor of a wind turbine in a designated position. In order to force the rotor to turn in a desired direction, the control unit may actuate one or more of the group of the generator, the pitch system and the yaw system.

Some exemplary embodiments include an engagement of the rotor-brake before inserting the rotor-lock. With the rotor-brake applied before applying the rotor-lock, it is maybe easier to insert a locking bolt or a locking plate. After applying the rotor-brake, the rotor-lock is applied 330. With the rotor-lock applied, the rotor-brake may be released 340. Next, typical embodiments include forcing the rotor to turn in a first direction 350. By doing so, tolerances may be driven out in the first direction.

Typical embodiments use the generator of the wind turbine for forcing the rotor to turn in the first direction. Other typical embodiments include an additional electrical machine for this task. A further possibility of further exemplary embodiments is to use the rotor blades for turning the rotor in the first direction for driving the tolerances of the rotor-lock out.

After the tolerances are driven out in the first direction, typical embodiments include applying of the rotor-brake 360. Hence, the rotor is fixed in a position with the lock clearance driven out in the first direction. After applying the rotor-brake, the applied torque may be released from the rotor 360. In typical embodiments, the generator is switched off or a shaft clutch is released for releasing the applied torque. The applied torque which is released after having applied the rotor brake is usually the torque used to force the rotor in the first direction In typical embodiments the blades are arranged in a parked position. By doing so, a maximum load during storm on the rotor-lock and the rotor-brake may be reduced. Usually, the parked position is with the trailing edge of the blades pointing downwind. There are other positions possible, like with the trailing edge pointing forward. This is usually the assembly and pre-commissioning position, creating clearance to the soil when a rotor is assembled on the ground. Exemplary embodiments include an arranging of the blades in a parked position after turning the rotor in the first direction. By doing so, the blades may be first used to force the rotor to turn in the first direction. Afterwards, the rotor blades may be arranged in the parked position. Another possibility is to arrange the rotor blades in a parked position only in case the wind condition reaches a predetermined limit. Typically, the second direction corresponds to the direction of normal rotation. Usually Exemplary embodiments of methods are suitable for several kinds of wind turbines. Some advantages arise with wind turbines having a maximum expected load of the rotor-lock and the rotor-brake in a first direction being greater than in a second direction opposite to the first direction. This is the case for most or all of known wind turbines. The reason is that the rotor blades are not symmetric; the torque which must be handled by the rotor-lock and the rotor-brake may be greater in a second direction than in a first direction. This is regularly true for any pitch position of the blades. Typically, the maximum expected load is an expected maximum storm load of the wind turbine with the rotor blades positioned in a parked position. Further embodiments have a maximum expected load during service tasks. Typically, the second direction corresponds to the direction of normal rotation. This is usually the direction in which the extreme torque is higher. In methods and devices of embodiments, the clearances are typically driven out opposite to the direction of normal rotation. The term "normal rotation" corresponds usually to the direction of rotation during generating electricity or in an operating state with the generator being driven by the rotor due to regular wind conditions.

Figure 5:
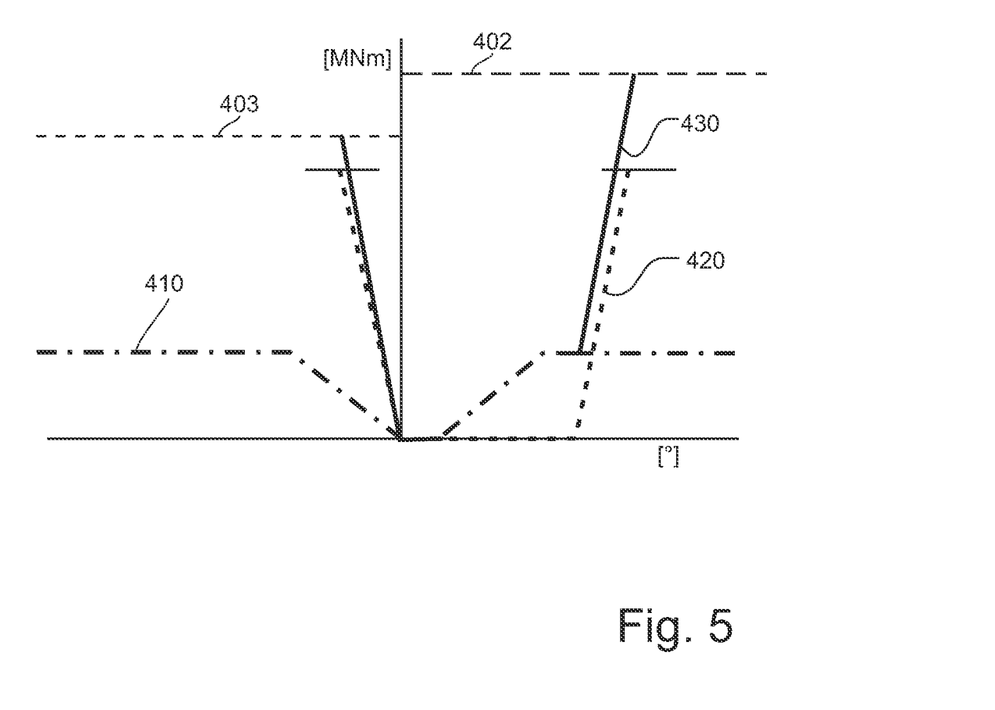
FIG. 5 is a diagram showing the relation of the clearances of the rotor-brake and the rotor-lock of a typical embodiment.

FIG. 5 is a diagram showing the relation of the clearances of the rotor-brake and the rotor-lock, and the load limits of the rotor-lock and the rotor-brake. The vertical axis marks the position with the clearance of the rotor-brake driven out in the first direction. The diagram shows torque over angular displacement. Line 410 refers to the load on the rotor blade and line 420 refers to the load on the rotor-lock. Line 430 refers to the sum of the load on the rotor-brake and the rotor-lock. As can be seen in FIG. 5, the sum of the maximum load of the rotor-lock and the rotor-brake is higher in the second direction depicted by line 402 compared to the first direction depicted by line 403. The second direction is represented by the right half of FIG. 5. The first direction is represented by the left half of FIG. 5.

A further point of FIG. 5 is the relation of the clearances of the rotor-lock and the rotor-brake and the deflections at maximum load. For a use of the combination of the rotor-lock and the rotor-brake, the sum of the brake clearance of the rotor-brake and the brake deflection at maximum brake load is smaller than the sum of the lock clearance and the lock deflection at maximum lock load. Thereby, the rotor-brake provides slipping before the rotor-lock is at its maximum rotor-lock load limit. By doing so, the rotor-lock at the rotor-brake may be used in parallel. It should be noted, that a slipping of the rotor brake only occurs in extreme load cases, e.g. wind gusts. During normal conditions, there will be no slipping of the rotor-brake. However, wind turbines have to fulfill national standards or international standards defining maximum load cases. Typical embodiments provide a cheap and reliable possibility to fulfill these standards.

Exemplary embodiments of systems and methods for wind turbines are described above in detail. The systems and methods are not limited to the specific embodiments described herein, but rather, components of the systems and/or steps of the methods may be utilized independently and separately from other components and/or steps described herein. For example, the exemplary methods for locking or braking of wind turbines are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of locking a rotor of a wind turbine, the method comprising:
   a) positioning the rotor in a locking position;
   b) applying a rotor lock so that the rotor lock engages a locking recess of the rotor;
   c) forcing the rotor to turn in a first direction while the rotor lock still engages the locking recess of the rotor; and,
   d) applying a rotor brake.

2. The method of claim 1, wherein after applying the rotor lock, the rotor is forced to turn in the first direction until a lock clearance of the rotor lock in the first direction is driven out.

3. The method of claim 1, further comprising applying the rotor brake before applying the rotor lock.

4. The method of claim 3, further comprising releasing the rotor brake after applying the rotor lock and before turning the rotor in the first direction.

5. The method of claim 1, further comprising arranging at least one rotor blade of the rotor with a pitch angle to force the rotor to turn in the first direction.

6. The method of claim 5, further comprising arranging the at least one rotor blade in a parked position after having applied the rotor brake.

7. The method of claim 1, further comprising applying energy to a generator of the wind turbine for applying torque to the rotor in the first direction for forcing the rotor to turn in the first direction.

8. The method of claim 7, further comprising arranging rotor blades in a parked position.

9. The method of claim 7, further comprising releasing the applied torque after having applied the rotor brake.

10. The method of claim 1, wherein a maximum expected load on the rotor lock and the rotor brake is greater in the first direction than in a second direction opposite to the first direction, the second direction being a direction of normal rotation of the rotor.

11. The method of claim 10, wherein the maximum expected load is an expected extreme event load on the wind turbine with the rotor blades positioned in a parked position.

12. The method of claim 1, wherein the sum of a brake clearance of the rotor brake and a brake deflection at maximum brake load is smaller than the sum of a lock clearance and a lock deflection at maximum lock load of the rotor lock.

13. A wind turbine comprising:
a) a rotor for transmitting torque from rotor blades to a rotor shaft;
b) a rotor lock engageable with the rotor shaft; and,
c) a rotor brake engageable with the rotor shaft;
wherein the sum of a brake clearance of the rotor brake and a brake deflection at maximum brake load is smaller than the sum of a lock clearance and a lock deflection at maximum lock load of the rotor lock.

14. The wind turbine of claim 13, wherein the rotor brake allows slip of the rotor shaft at maximum brake load.

15. The wind turbine of claim 13, wherein the rotor brake comprises a disk brake.

16. The wind turbine of claim 13, wherein the rotor lock comprises a recess and a bolt for an engagement with the recess.

17. The wind turbine of claim 16, wherein the bolt has a smaller diameter than the recess.

18. The wind turbine of claim 13, wherein the rotor lock and the rotor brake are engageable in parallel.

19. A wind turbine comprising:
a) a rotor for transmitting torque from rotor blades to a rotor shaft;
b) a rotor lock engageable with the rotor shaft;
c) a rotor brake engageable with the rotor shaft; and,
d) a control unit adapted for
  a. positioning the rotor in a locking position;
  b. applying the rotor lock so that the rotor lock engages a locking recess of the rotor;
  c. forcing the rotor to turn in a first direction while the rotor lock still engages the locking recess of the rotor; and,
  d. applying the rotor brake.

20. The wind turbine of claim 19, wherein the sum of a brake clearance of the rotor brake and a brake deflection at maximum brake load is smaller than the sum of a lock clearance and a lock deflection at maximum lock load.

\* \* \* \* \*